United States Patent
Bassett et al.

(10) Patent No.: US 6,859,853 B2
(45) Date of Patent: Feb. 22, 2005

(54) METHOD AND APPARATUS FOR DRIVING SIGNALS ON A BUS

(75) Inventors: David Bassett, San Jose, CA (US); Gary Browning, Boulder Creek, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 573 days.

(21) Appl. No.: 09/846,960

(22) Filed: May 1, 2001

(65) Prior Publication Data

US 2002/0166011 A1 Nov. 7, 2002

(51) Int. Cl.[7] ............................................. G06F 13/14
(52) U.S. Cl. ...................................................... 710/305
(58) Field of Search ................................ 710/100, 107, 710/300, 305, 307

(56) References Cited

U.S. PATENT DOCUMENTS

| | | | | |
|---|---|---|---|---|
| 5,528,765 A | * | 6/1996 | Milligan | 710/107 |
| 5,530,813 A | * | 6/1996 | Paulsen et al. | 710/317 |
| 5,613,077 A | * | 3/1997 | Leung et al. | 710/305 |
| 6,192,422 B1 | * | 2/2001 | Daines et al. | 710/29 |
| 6,389,501 B1 | * | 5/2002 | Garney et al. | 710/310 |
| 6,591,322 B1 | * | 7/2003 | Ervin et al. | 710/110 |
| 6,597,197 B1 | | 7/2003 | Mosley et al. | |
| 6,636,921 B1 | | 10/2003 | Scholhamer et al. | |
| 6,664,815 B2 | | 12/2003 | Andrews et al. | |
| 2002/0078289 A1 | * | 6/2002 | Morrow | 710/300 |

* cited by examiner

*Primary Examiner*—Paul R. Myers
(74) *Attorney, Agent, or Firm*—Meyertons Hood Kivlin Kowert & Goetzel, P.C.; B. Noël Kivlin (57) ABSTRACT

A method is provided for controllably delivering signals on a bus, wherein the bus is comprised of a first and second segment. The method comprises monitoring the first bus segment for the presence of a first signal being driven thereon. Thereafter, the first signal is repeated on the second bus segment. To prevent the repeated signal from being repeated again, the second bus segment is not monitored during the repeating phase of the operation.

19 Claims, 4 Drawing Sheets

METHOD AND APPARATUS FOR DRIVING SIGNALS ON A BUS

BACKGROUND OF THE INVENTION

1. Field of the Invention

This invention relates generally to driving signals on a bus, and, more particularly, to a repeater capable of driving a signal onto a plurality of bus segments with only a single clock delay.

2. Description of the Related Art

Generally, computer systems are comprised of a plurality of components, such as processors, memory, interfaces to various peripheral devices, and the like. These components typically communicate with one another via one or more buses. Various driver circuits have been employed to control the generation and detection of signals on these buses. One type of driver circuit that has been commonly employed in high-end computer systems, such as servers, is known as driver transistor logic (DTL).

High-end computer systems, such as servers, tend to be physically large such that the components tend to be spaced significant distances from one another. Thus the buses tend to be physically long, causing significant delays to be experienced by signals delivered over these relatively long distances. Further, these types of systems typically have more components, and thus, more bus segments over which signals must be driven. Both of these factors tend to increase the amount of time it takes to pass a signal over the bus. DTL type circuits have been very successful in these types of systems because they are particularly good at accommodating these significant delays. One aspect of the DTL type circuits that is at least partially responsible for this behavior is that each bus transaction is divided into two parts. That is, signals are delivered onto and retrieved off of the bus over a period of two clock cycles. One advantage that arises out of this two-clock-cycle requirement is that the frequency of the bus may be increased to help data throughput.

One significant disadvantage to DTL type circuits is that they do not scale down well. For example, in less expensive and smaller systems, the components tend to be fewer in number and closer together, and thus, are capable of operating at a substantially faster rate. DTL type circuits, however, remain limited by the two-clock-cycle requirement.

SUMMARY OF THE INVENTION

In one aspect of the present invention, a method is provided for controllably delivering signals on a bus wherein the bus is comprised of a first and second segment. The method comprises: monitoring the first bus segment for the presence of a first signal being driven thereon; repeating the first signal on the second bus segment; and preventing the first signal from being repeated on the first bus.

In another aspect of the present invention, an apparatus is provided for controllably delivering signals on a bus wherein the bus is comprised of a first and second segment. The apparatus is comprised of a first bit line in the first bus segment, a first bit line in the second bus segment, a first and second receiver, a first and second transmitter, and a first and second blocker. The first receiver is coupled to the first bit line in the first segment and is adapted for detecting the presence of a signal being driven on the first bit line and providing a first signal indicative of the presence of the driven signal. The second receiver is coupled to the first bit line in the second segment and is adapted for detecting the presence of a signal being driven on the first bit line in the second segment and providing a second signal indicative of the presence of the driven signal. The first transmitter is coupled to the first bit line in the first segment. The first transmitter is adapted to drive a signal on the first bit line of the first bus segment in response to receiving the second signal. The second transmitter is coupled to the first bit line in the second bus segment. The second transmitter is adapted to drive a signal on the first bit line of the second bus segment in response to receiving the first signal. The first blocker is adapted to prevent the first transmitter from driving the signal on the first bit line of the first bus segment in response to receiving the second signal, and the second blocker is adapted to prevent the second transmitter from driving the signal on the first bit line of the second bus segment in response to receiving the first signal.

BRIEF DESCRIPTION OF THE DRAWINGS

The invention may be understood by reference to the following description taken in conjunction with the accompanying drawings, in which the leftmost significant digit(s) in the reference numerals denote(s) the first figure in which the respective reference numerals appear, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but, on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation—specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Illustrative embodiments of a method and apparatus for providing a bus driver circuit according to the present invention are shown in FIGS. 1–4. As will be readily apparent to those skilled in the art upon a complete reading of the present application, the present method and apparatus are applicable to a variety of computer systems other than the embodiment illustrated herein, and moreover to electronic devices other than computer systems, including, but not limited to, logic devices, memory devices, and the like.

Figure 1:
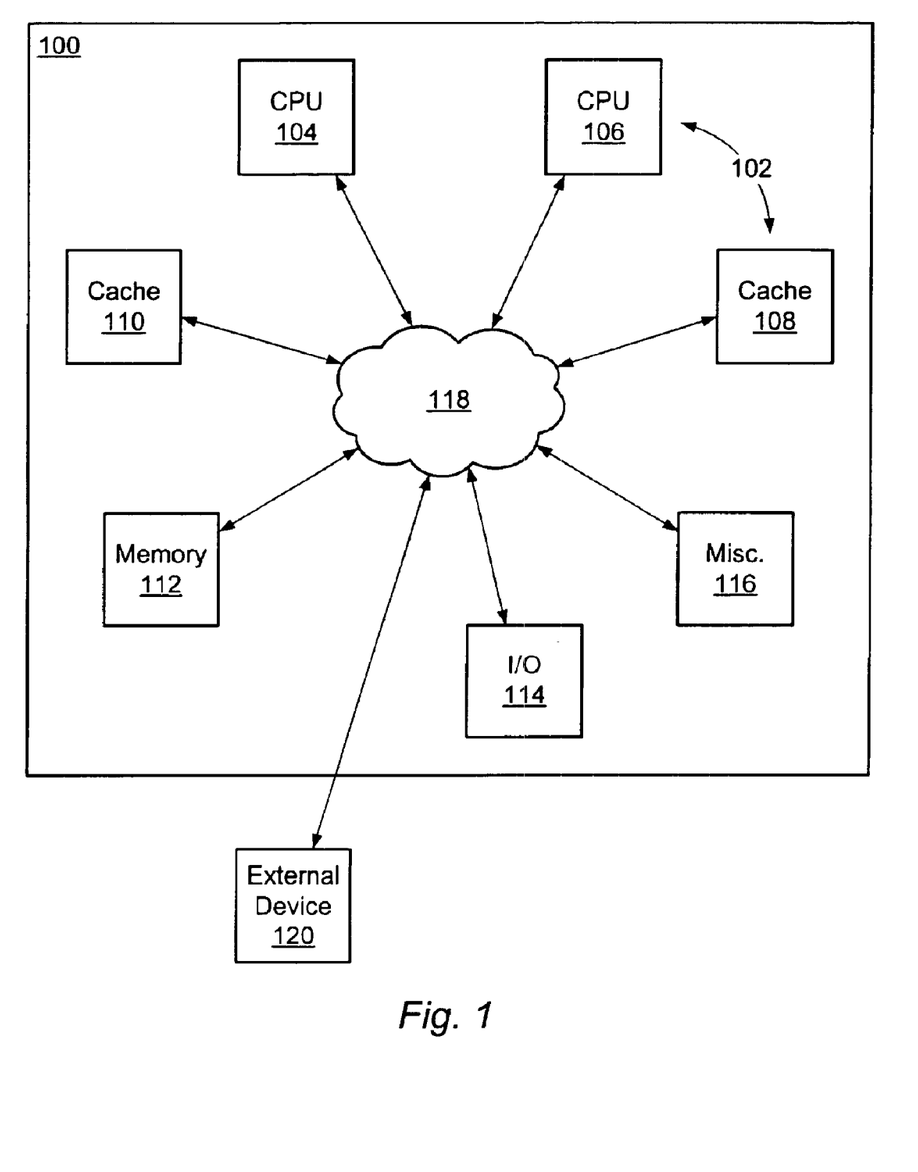
FIG. 1 illustrates a stylized representation of a computer system that may advantageously employ one or more of the aspects of the present invention.

Turning now to FIG. 1, a stylized representation of a computer system 100 that may advantageously employ one or more of the aspects of the present invention is shown. Generally, the computer system 100 is comprised of exemplary components 102, such as a first and second central processing unit (CPU) 104, 106, a first and second cache 108, 110, a memory 112, input/output (I/O) 114, and other miscellaneous components 116, such as a sound card, a video card, and the like. These components 102 are coupled together via an architecture 118, which allows the components 102 to efficiently communicate with one another and potentially with other external devices (not shown), such as other computer systems, printers, scanners, etc. Additionally, a device 120 may be located physically external to the computer system 100, such as outside of a housing or case that contains the computer system 100, but may functionally operate as part of the computer system 100 by virtue of a high-speed connection to the computer system.

The architecture 118 may take on any of a variety of forms without departing from the spirit and scope of the instant invention. To illustrate various aspects of the instant invention, the implementation of the invention in an exemplary architecture is shown beginning in FIG. 2. However, the instant invention admits to much wider application and should not be considered as being limited to the particular architecture 118 illustrated herein unless specifically set forth in the appended claims.

Figure 2:
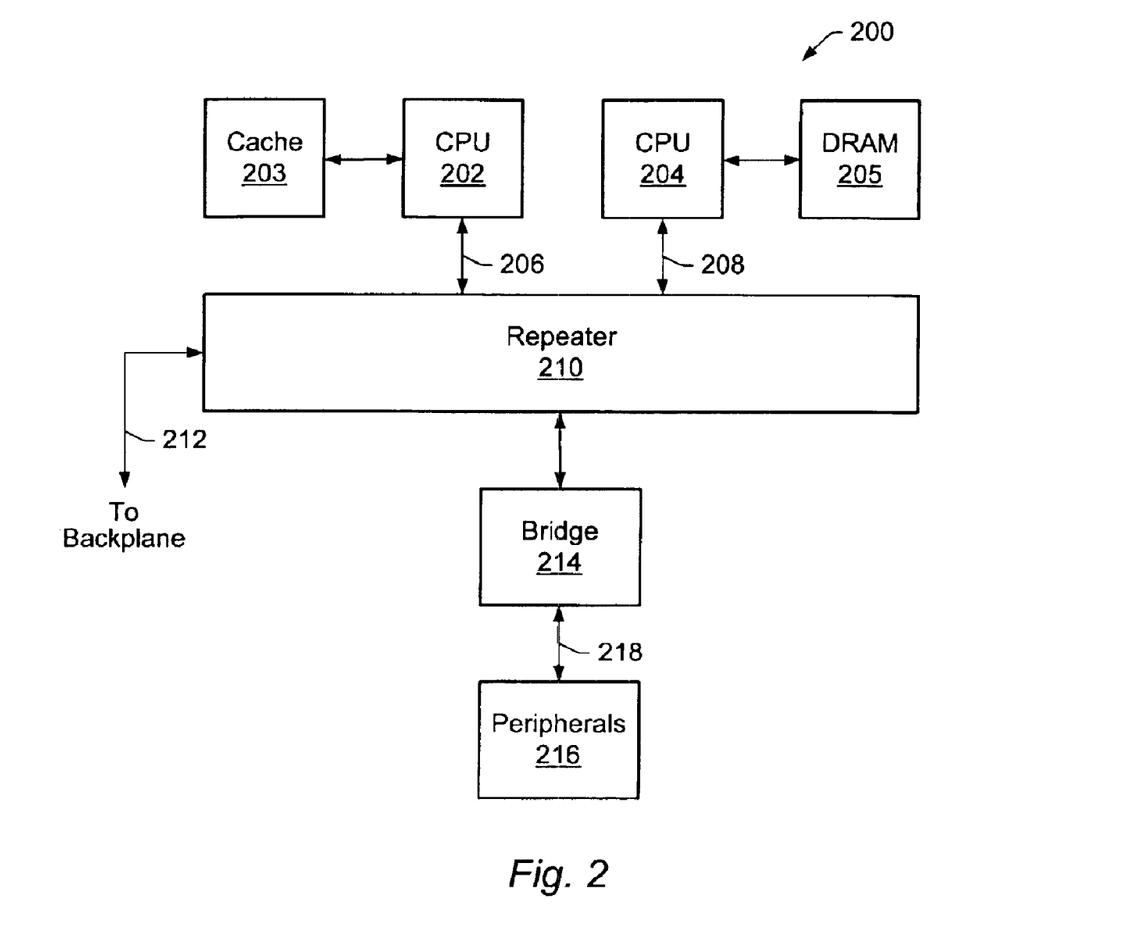
FIG. 2 schematically illustrates one embodiment of a top level block diagram of the computer system of FIG. 1.

FIG. 2 illustrates a top-level block diagram of one embodiment of a computer system 200 that may advantageously employ one or more aspects of the present invention. The computer system 200 may comprise a pair of central processing units (CPUs) 202, 204, such as UltraSPARC™ or MicroSPARC™ microprocessors commercially available from Sun Microsystems. Those skilled in the art, having benefit of the accompanying specification, will appreciate that the present invention has application in a variety of computer systems, including single and multiple CPU systems. In one exemplary embodiment, the instant invention may be employed in a computer system having four microprocessors. In the illustrated embodiment, the first and second CPUs 202, 204 each have at least one, and in some cases more than one, type of memory associated with them. The memory may take the form of dynamic random access memory (DRAM) 205, a cache 203, both, multiple levels of each, or some combination thereof. Generally, the memory is used by the CPUs 202, 204 during normal operation for temporary storage of data and/or instructions.

The CPUs 202, 204 are coupled to substantially similar input ports of a repeater 210 over processor buses (or JBUSes) 206, 208, respectively. As its name suggests, the function of the repeater 210 is to receive signals over one of the buses 206, 208 and repeat or deliver those same signals over the other one of the buses 206, 208. In this way, the CPUs 202, 204 communicate with one another. In an embodiment of the computer system 200 that includes more CPUs, such as a four CPU system, the repeater 210 operates to repeat or deliver the signals from one CPU to all of the other CPUs even if the signals are not directed to all of the other CPUs. This "broadcasting" of signals to all of the CPUs ensures that all of the CPUs receive all of the signals initiated by each CPU. The CPUs are individually responsible for determining which of the received signals are intended for or of interest to it. The repeater 210 sequentially responds to signals delivered by each of the CPUs and broadcasts those signals to all of the other CPUs so that each CPU can communicate with every other CPU.

The repeater 210 includes an additional port coupled to a bus 212. The additional port is substantially similar to the ports coupled to the buses 206, 208. Generally, the additional port functions substantially similar to the ports coupled to the processors 202, 204, with one exception being that it may be disabled or otherwise prevented from repeating or delivering signals generated by the processors 202, 204 onto the bus 212 under select operating conditions.

A conventional bridge 214 interfaces a plurality of peripheral devices 216 with the CPUs 202, 204 and/or the external device through the repeater 210. Generally, the peripheral devices 216 are of a type designed to communicate over a bus 218 of a preselected type different from the buses 206, 208, 212. For example, the bus 218 may take the form of a conventional peripheral component interface (PCI) bus, an industry standard architecture (ISA) bus, a proprietary bus, or the like. Generally, the bridge 214 interfaces the different standards used by the buses 206, 208, 212 and the bus 218 so that they may allow the CPUs 202, 204 to communicate with the peripherals 216, or vice versa.

Figure 3:
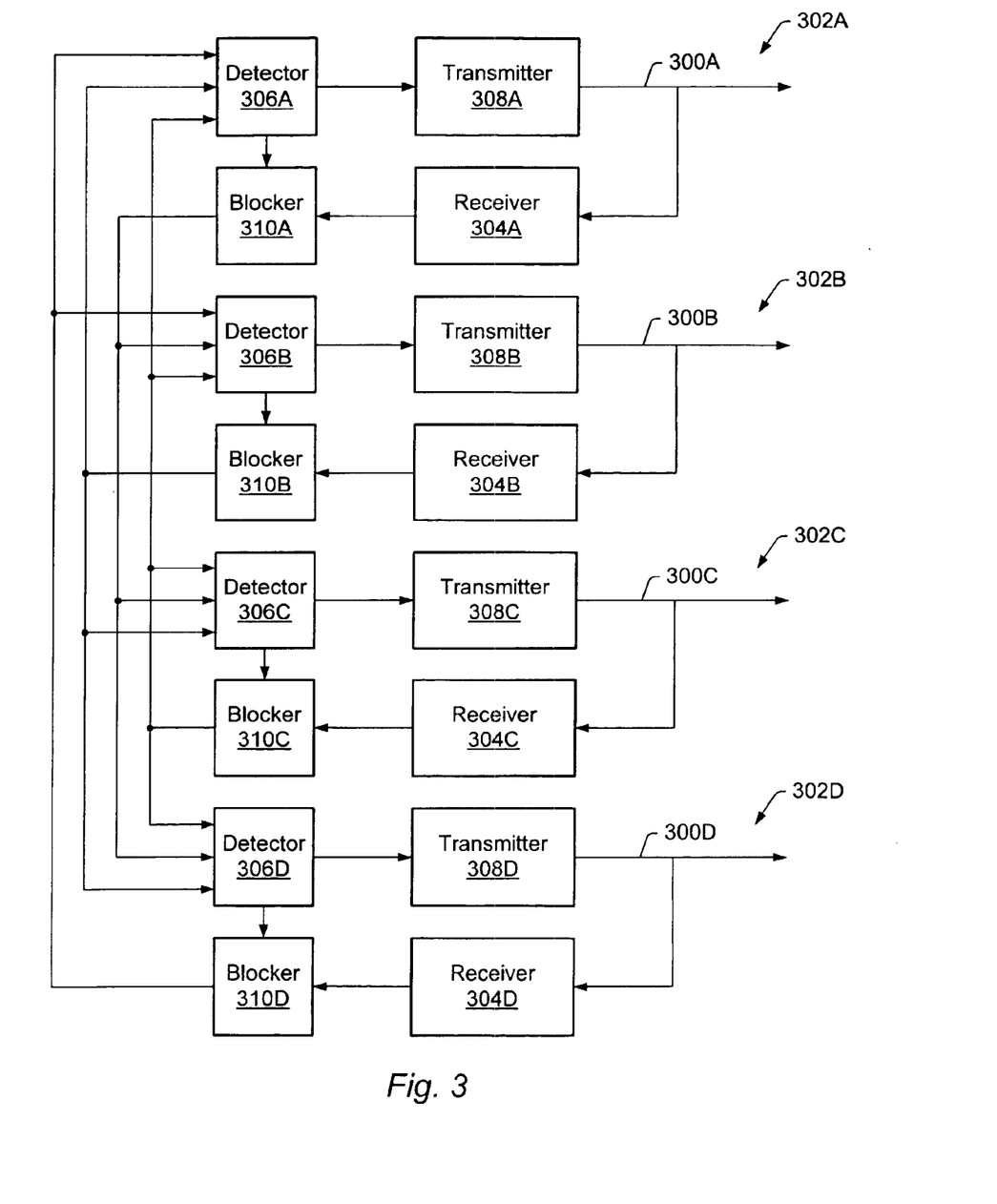
FIG. 3 schematically illustrates a block diagram of a driver circuit found in a repeater of the computer system of FIG. 2.

Turning now to FIG. 3, one embodiment of a portion of the repeater 210 is shown in functional block diagram form. In the illustrated embodiment, the repeater 210 is configured to monitor four bus segments for the presence of a signal on one of the segments, and then upon detecting such a signal, repeating the detected signal onto the remaining three bus segments. Each line in each of the four bus segments has a substantially identical driver associated with it in the repeater 210. Accordingly, for ease of illustration, only the drivers associated with all four bus segments of a single bit line is illustrated in FIG. 3. Those skilled in the art will appreciate that the circuitry shown herein may be repeated according the size of the bus. For example, if the bus is selected to be 170-bits wide, then the circuitry illustrated herein may be repeated 170 times so that all 170 bits on each bus segment may be monitored and repeated onto the other bus segments. Additionally, while the repeater 210 is illustrated as having four bus segments, more or fewer segments may be provided without departing from the scope of the instant invention.

As shown in FIG. 3, four bit lines 300A–300D are shown, where each of the four bit lines is associated with four segments 302A–302D, respectively. Four devices, such as microprocessors, may be coupled to each of the bus segments. Generally, the repeater 210 responds to a signal driven onto the bit line 300A of the bus segment 302A by repeating or driving the same signal onto the remaining bit lines 300B–300D of the bus segments 302B–302D.

More particularly, receivers 304A–304D monitor the bit lines 300A–300D to determine if a signal has been driven onto the bit lines 300A–300D. Upon detecting a signal being driven onto its respective bit line 300A–300D, the receiver 304A–304D delivers a signal to a detector 306A–306D of the other three drivers. For example, when the receiver 304A detects a signal being driven on the bit line 300A, the receiver 304A delivers a signal to the detectors 306B–306D. The detectors 306B–306D respond to the signal from the receiver 304A by delivering a signal to associated transmitters 308B–308D. Thus, the transmitters 308B–308D repeat or drive the signal detected on the bit line 300A onto the bit lines 300B–300D. Similarly, when the receiver 304D detects a signal being driven on the bit line 300D, the receiver 304D delivers a signal to the detectors 306A–306C. The receivers 306A–306C respond to the signal from the receiver 304D by delivering a signal to associated transmitters 308A–308C. Thus, the transmitters 308A–308C repeat or drive the signal detected on the bit line 300D onto the bit lines 300A–300C. Similar operations occur when signals are detected on the bit lines 300B and 300C.

Blockers 310A–310D are disposed to prevent the receivers 304A–304D from detecting the signal that they have repeated or driven onto their own bit lines 300A–300D via their associated transmitters 308A–308D. That is, when the receiver 304A detects a signal being driven on the bit line 300A, the receiver 304A will ultimately cause the transmitters 308B–308D to drive signals onto the bit lines 300B–300D. Unless interrupted by the blockers 310B–310D, the receivers 304B–304D will detect the signals driven by their associated transmitters 308B–308D and attempt to force the other transmitters to repeat or drive these signals onto the bit lines. The blockers 310A–310D limit this runaway repeating condition.

In the illustrated embodiment, the blockers 310A–310D are shown disposed intermediate the receivers 304A–304D and the detectors 308A–308D. Those skilled in the art will appreciate that the blockers 310A–310D could be positioned at other locations, such as between the bit lines 300A–300D and the receivers 304A–304D without departing from the scope of the instant invention.

Figure 4:
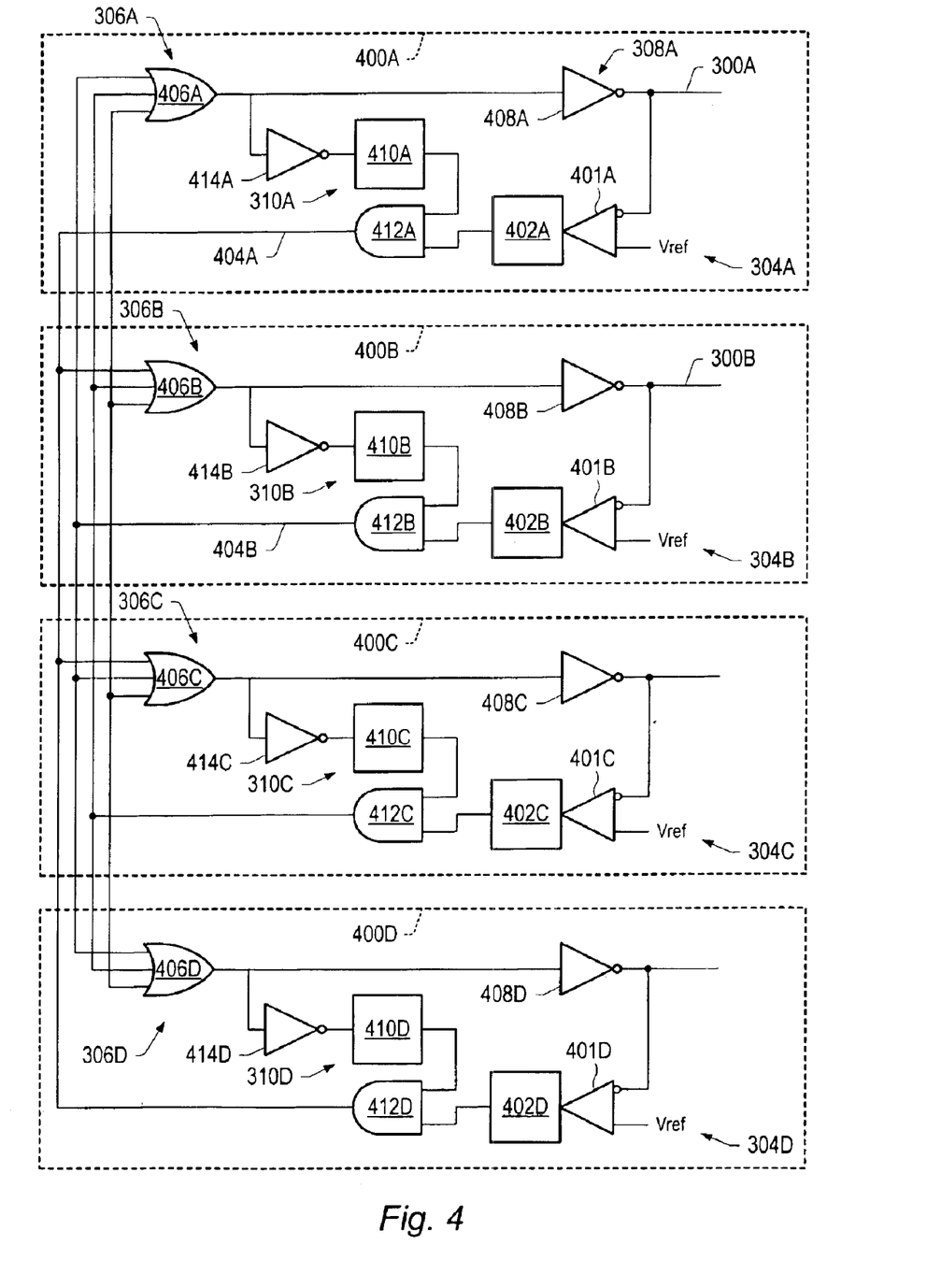
FIG. 4 illustrates a schematic diagram of a portion of the driver circuit of FIGS. 3.

Turning now to FIG. 4, one embodiment of a portion of the repeater 210 of FIG. 3 is shown in schematic form. The illustrated circuitry is comprised of four circuits 400A–400D. The receivers 304A–304D are respectively comprised of a comparator 401A–401D coupled to a D-type flip flop 402A–402D. Normally, the bit lines 300A–300D are maintained at a logically high level, which is passed by the comparator 401A–401D to the D-type flip flops 402A–402D as a logically low signal due to an inverted input on the comparator 401A–401D. When one of the bit lines 300A–300D is driven to a logically low level, such as by a microprocessor coupled to the corresponding bus segment 302A–302D, the comparator 401A–401D produces a logically high signal, which is passed to the D-type flip flops 402A–402D. Timing of the D-type flip flops 402A–402D is controlled by a conventional clock signal applied to a clock terminal (not shown) of each of the D-type flip flops 402A–402D. Thus, when a logically high signal is present on the bit lines 300A–300D, the D-type flip flops 402A–402D have a logically low signal stored therein. Alternatively, when a device attached to the bit lines 300A–300D drives a logically low signal onto the bit lines 300A–300D, a logically high signal is stored in the D-type flip flops 402A–402D.

Those skilled in the art will appreciate that the computer system 200 may include bus arbitration logic (not shown) that operates to grant control of the bus to the devices coupled thereto based upon some type of rotating scheme. That is, the bus arbitration logic, under normal operating conditions, permits only one of the devices coupled to one of the bus segments to drive signals onto the bus at a time. Thus, normally, the only one of the bit lines 300A–300D will be driven by its associated external device during any given clock cycle.

The signal stored in the D-type flip flops 402A–402D is delivered over a line 404A–404D to the three other circuits 400A–400D. For example, the signal stored in the D-type flip flop 402A in the circuit 400A is delivered to the detectors 306B–306D in the circuits 400B–400D. A logically high signal is received at the detectors 306B–306D when a logically low signal is driven on the bit line 300A. The detectors 306A–306D are comprised of an OR gate 406A–406D. Thus, the OR gates 406B–406D deliver a signal to their corresponding transmitters 408B–408D, which causes the transmitters 408B–408D to repeat the low signal present on the bit line 300A on the bit lines 300B–300D. Similarly, a low signal driven onto the bit line 300C is detected by the comparator 401C and stored in the D-type flip flop 402C as a logically high signal. The logically high signal stored in the D-type flip flop is delivered to the OR gates 406A, 406B, and 406D, which causes the transmitters 408A, 408B, and 408D to repeat the low signal present on the bit line 300C on the bit lines 300A, 300B, and 300D. Similar operations occur when a logically low signal is driven onto the bit lines 300B and 300D.

The blockers 310A–310D included in the circuits 400A–400D include a D-type flip flop 410A–410D and an AND gate 412A–412D. The output port of the OR gate 406A–406D is coupled through an inverter 414A–414D to the D-type flip flop 410A–410D. The D-type flip flop 410A–410D includes a clock input terminal coupled to the same clock signal as the D-type flip flop 402A–402D, and thus, is synchronized therewith. The AND gate 412A–412D has two input terminals coupled to output terminals of the D-type flip flops 402A–402D and 410A–410D. Thus, the D-type flip flop 410A–410D operates to enable the AND gate 412A–412D to pass the signal stored in the flip flop 402A–402D to the OR gates 406A–406D.

The overall operation of the circuits 400A–400D may be appreciated by a description of an exemplary bus transaction. For example, assume that a logically low signal is driven onto the bit line 300B by an external device, and that none of the other bus segments 302A, 302C, and 302D are currently being driven by an external device. The low signal on the bit line 300B causes a logically high signal to be stored in the D-type flip flop 402B at the time that a transition occurs in the clock signal. The logically high signal is passed through the AND gate 412B to the OR gates 406A, 406C, and 406D, causing the transmitters 408A, 408C, and 408D to repeat or drive a logically low signal onto the bit lines 300A, 300C, and 300D, insuring that the signal initiated by the external device coupled to the bus segment 302B is communicated to external devices coupled to the bus segments 302A, 302C, and 302D. Additionally, a logically low signal is stored in the D-type flip flops 410A, 410C, and 410D, which disables the AND gates 412A, 412C, and 412D. Thus, even though a logically low signal is being driven onto the bit lines 300A, 300C, and 300D, they are being blocked from being repeated on the remaining bus segments, as they were not initiated by the external device coupled to that bus segment, but rather, are being repeated. That is, the blockers 310A–310D prevent the repeated signals from being repeated again.

Those skilled in the art will appreciate that the time lag between an external device driving a signal onto its bus segment and the signal being repeated on the remaining bus segments corresponds to only one clock cycle. Further, standard input/output or interconnect testing of electronic devices is often accomplished using various conventional methodologies. For example, a Joint Test Access Group (JTAG) boundary scan (which is set forth in IEEE 1149.1) is commonly used. The implementation of the instant invention does not preclude the use of these standardized testing methodologies.

Those skilled in the art will appreciate that the logic levels discussed herein are matters of design discretion and could be readily reversed without departing from the spirit and scope of the instant invention. For example, the bit lines 300A–300D could be readily configured to normally be in a logically low state, and the circuits 400A–400D could be configured to respond to the bit lines 300A–300D being driven to a logically high level.

In the illustrated embodiment, the computer system 200 includes both hardware and software. At least a portion of the hardware described herein may be replaced by a processing unit programmed to execute software to implement some or all of the functions described herein. In particular, the functions of the repeater 210 described herein may be performed by one or more processing units that may or may not be geographically dispersed.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below.

What is claimed is:

1. A method for controllably delivering signals on a bus wherein the bus is comprised of a first and second segment, the method comprising:
   monitoring the first bus segment for the presence of a first signal being driven thereon;
   repeating the first signal on the second bus segment;
   preventing the first signal from being repeated on the first bus segment, and
   maintaining the first and the second bus segments at a logically high level in the absence of a logically low signal being driven thereon.

2. A method, as set forth in claim 1, further comprising:
   monitoring the second bus segment for the presence of a second signal being driven thereon;
   repeating the second signal on the first bus segment; and
   preventing the second signal from being repeated on the second bus.

3. A method, as set forth in claim 1, wherein monitoring the first bus segment for the presence of the first signal being driven thereon further comprises monitoring the first bus segment for the presence of a logically low signal being driven thereon.

4. A method, as set forth in claim 3, wherein repeating the first signal on the second bus segment further comprises driving a logically low signal on the second bus segment.

5. A method, as set forth in claim 1, further comprising maintaining the first and second bus segments at a logically low level in the absence of a logically high signal being driven thereon.

6. A method, as set forth in claim 5, wherein monitoring the first bus segment for the presence of the first signal being driven thereon further comprises monitoring the first bus segment for the presence of a logically high signal being driven thereon.

7. A method, as set forth in claim 6, wherein repeating the first signal on the second bus segment further comprises driving a logically high signal on the second bus segment.

8. A method, as set forth in claim 7, wherein monitoring the first bus segment for the presence of the first signal being driven thereon further comprises detecting the first signal and delivering an indication of the presence of the first signal, and wherein repeating the first signal on the second bus segment further comprises delivering the first signal on the second bus in response to receiving the indication of the presence of the first signal on the first bus.

9. A method, as set forth in claim 8, wherein preventing the first signal from being repeated on the first bus further comprises blocking the delivery of the indication of the presence of the first signal on the second bus.

10. A method, as set forth in claim 8, wherein preventing the first signal from being repeated on the first bus further comprises blocking the detection of the first signal on the second bus.

11. An apparatus for controllably delivering signals on a bus wherein the bus is comprised of a first and second segment, the apparatus comprising:
    means for monitoring the first bus segment for the presence of a first signal being driven thereon;
    means for repeating the first signal on the second bus segment;
    means for preventing the first signal from being repeated on the first bus; and
    means for maintaining the first and second bus segments at a logically high level in the absence of a logically low signal being driven thereon.

12. An apparatus for controllably delivering signals on a bus wherein the bus is comprised of a first and second segment, the apparatus comprising:
    a first bit line in the first bus segment;
    a first bit line in the second bus segment;
    a first receiver coupled to the first bit line in the first segment and being adapted for detecting the presence of a signal being driven on the first bit line and providing a first signal indicative of the presence of the driven signal;
    a second receiver coupled to the first bit line in the second segment and being adapted for detecting the presence of a signal being driven on the first bit line in the second segment and providing a second signal indicative of the presence of the driven signal;
    a first transmitter coupled to the first bit line in the first segment, the first transmitter being adapted to drive a signal on the first bit line of the first bus segment in response to receiving the second signal;
    a second transmitter coupled to the first bit line in the second bus segment, the second transmitter being adapted to drive a signal on the first bit line of the second bus segment in response to receiving the first signal;
    a first blocker adapted to prevent the first transmitter from driving the first signal on the first bit line of the first bus segment in response to receiving the second signal; and
    a second blocker adapted to prevent the second transmitter from driving the signal on the first bit line of the second bus segment in response to receiving the first signal.

13. A method for controllably delivering signals on a bus wherein the bus is comprised of a first and second segment, the method comprising:
    monitoring the first bus segment for the presence of a first signal being driven thereon;
    repeating the first signal on the second bus segment;
    preventing the first signal from being repeated on the first bus; and
    maintaining the first and second bus segments at a logically low level in the absence of a logically high signal being driven thereon.

14. A method, as set forth in claim 13, further comprising:
   monitoring the second bus segment for the presence of a second signal being driven thereon;
   repeating the second signal on the first bus segment; and
   preventing the second signal from being repeated on the second bus.

15. A method, as set forth in claim 13, wherein repeating the first signal on the second bus segment further comprises driving a logically high signal on the second bus segment.

16. A method for controllably delivery signals on a bus wherein the bus is comprised of a first and second segment, the method comprising:
   monitoring the first bus segment for the presence of a first being driven thereon;
   repeating the first signal on the second bus segment;
   preventing the first signal from being repeated on the first bus;
   monitoring the second bus segment for the presence of a second signal being driven thereon;
   repeating the second signal on the first bus segment; and
   preventing the second signal from being repeated on the second bus;
   wherein monitoring the first bus segment for the presence of the first signal being driven thereon further comprises detecting the first and delivering an indication of the presence of the first signal, and wherein repeating the first signal on the second bus segment further comprises delivering the first signal on the second bus in response to receiving the indication of the presence of the first signal on the first bus.

17. A method, as set forth in claim 16, wherein preventing the first signal from being repeated on the first bus further comprises blocking the delivery of the indication of the presence of the first signal on the second bus.

18. A method, as set forth in claim 16, wherein preventing the first signal from being repeated on the first bus further comprises blocking the detection of the first signal on the second bus.

19. An apparatus for controllably delivering signals on a bus wherein the bus is comprised of a first and second segment, the apparatus comprising:
   means for monitoring the first bus segment for the presence of a first signal being driven thereon;
   means for repeating the first signal on the second bus;
   means for preventing the first signal from being repeated on the first bus; and
   means for maintaining the first and second bus segments at a logically low level in the absence of a logically high signal being driven thereon.

* * * * *

UNITED STATES PATENT AND TRADEMARK OFFICE
CERTIFICATE OF CORRECTION

PATENT NO. : 6,859,853 B2
DATED : February 22, 2005
INVENTOR(S) : David Bassett and Gary Browning It is certified that error appears in the above-identified patent and that said Letters Patent is hereby corrected as shown below:

Column 9,
Line 10, please delete "controllably delivery signals" and substitute -- controllably delivering signals --.
Line 14, please delete "being driven thereon;" and substitute -- signal being thereon; --.

Column 10,
Line 19, please delete "on the second bus;" and substitute -- on the second bus segment; --.

Signed and Sealed this

Twelfth Day of July, 2005

JON W. DUDAS
*Director of the United States Patent and Trademark Office*

UNITED STATES PATENT AND TRADEMARK OFFICE
CERTIFICATE OF CORRECTION

PATENT NO. : 6,859,853 B2
DATED : February 22, 2005
INVENTOR(S) : David Bassett and Gary Browning Page 1 of 1

It is certified that error appears in the above-identified patent and that said Letters Patent is hereby corrected as shown below:

Column 9,
Line 10, please delete "controllably delivery signals" and substitute -- controllably delivering signals --.
Line 14, please delete "being driven thereon;" and substitute -- signal being driven thereon; --.

Column 10,
Line 19, please delete "on the second bus;" and substitute -- on the second bus segment; --.

This certificate supersedes Certificate of Correction issued July 12, 2005.

Signed and Sealed this

Twenty-fifth Day of October, 2005

JON W. DUDAS
*Director of the United States Patent and Trademark Office*